United States Patent
Jain et al.

(10) Patent No.: US 10,708,053 B2
(45) Date of Patent: Jul. 7, 2020

(54) COORDINATING ACCESS AUTHORIZATION ACROSS MULTIPLE SYSTEMS AT DIFFERENT MUTUAL TRUST LEVELS

(71) Applicant: INTUIT INC., Mountain View, CA (US)

(72) Inventors: Parul Jain, Bangalore (IN); Douglas L. Foiles, San Diego, CA (US); Nagaraj Janardhana, Bangalore (IN)

(73) Assignee: INTUIT INC., Mountain View, CA (US)

( * ) Notice: Subject to any disclaimer, the term of this patent is extended or adjusted under 35 U.S.C. 154(b) by 353 days.

(21) Appl. No.: 15/650,470

(22) Filed: Jul. 14, 2017

(65) Prior Publication Data

US 2018/0337784 A1    Nov. 22, 2018

(30) Foreign Application Priority Data

May 19, 2017    (IN) ................................ 20173107737

(51) Int. Cl.
| | |
|---|---|
| *H04L 9/32* | (2006.01) |
| *H04L 29/06* | (2006.01) |
| *H04W 12/08* | (2009.01) |
| *G06F 21/44* | (2013.01) |
| *G06F 21/33* | (2013.01) |

(Continued)

(52) U.S. Cl.
CPC .......... *H04L 9/3213* (2013.01); *G06F 21/335* (2013.01); *G06F 21/445* (2013.01); *H04L 9/0891* (2013.01); *H04L 9/32* (2013.01); *H04L 63/105* (2013.01); *H04W 12/0804* (2019.01); *G06F 21/30* (2013.01); *G06F 21/31* (2013.01); *H04L 63/08* (2013.01)

(58) Field of Classification Search
CPC ... H04L 9/3213; H04L 63/105; H04L 9/0891; H04L 9/32; H04L 63/08; H04W 12/0804; G06F 21/30; G06F 21/31
See application file for complete search history.

(56) References Cited

U.S. PATENT DOCUMENTS

| | | | |
|---|---|---|---|
| 7,624,433 B1 * | 11/2009 | Clark | ..................... G06F 21/335 726/9 |
| 2014/0090037 A1 * | 3/2014 | Singh | .................. H04L 63/0815 726/7 |

(Continued)

*Primary Examiner* — J. Brant Murphy
(74) *Attorney, Agent, or Firm* — Patterson + Sheridan, LLP

(57) ABSTRACT

Embodiments presented herein provide a partner authentication (PA) system that coordinates a network-based authorization process for an application. The PA system exchanges a series of messages with the application seeking an access token for a protected resource, an authorization server associated with the resource, and an agent executing on a device accessed by a user who wants the application to access the resource. The PA system and the agent communicate with the authorization server on behalf of the application throughout the authorization process. The PA system receives an access token and a refresh token from the server on behalf of the application and sends a partner authorization (PA) token to the application. When the application seeks access to the resource that is available to authorized parties via the resource server, the application sends the PA token to the PA system and receives the access token in return.

20 Claims, 8 Drawing Sheets

(51) Int. Cl.
*H04L 9/08* (2006.01)
*G06F 21/30* (2013.01)
*G06F 21/31* (2013.01)

(56) References Cited

U.S. PATENT DOCUMENTS

| | | | |
|---|---|---|---|
| 2014/0189808 A1* | 7/2014 | Mahaffey | H04L 63/083 |
| | | | 726/4 |
| 2015/0089617 A1* | 3/2015 | Sondhi | H04L 63/08 |
| | | | 726/8 |
| 2016/0028737 A1* | 1/2016 | Srinivasan | H04L 63/0807 |
| | | | 726/1 |
| 2016/0150094 A1* | 5/2016 | Mandanapu | H04M 15/59 |
| | | | 455/406 |
| 2016/0226859 A1* | 8/2016 | Sondhi | H04L 63/08 |
| 2016/0379208 A1* | 12/2016 | Deliwala | G06Q 20/363 |
| | | | 705/67 |

* cited by examiner

COORDINATING ACCESS AUTHORIZATION ACROSS MULTIPLE SYSTEMS AT DIFFERENT MUTUAL TRUST LEVELS

CROSS-REFERENCE TO RELATED APPLICATIONS

This application claims benefit of India Provisional Patent Application Serial No. 201731017737, entitled "Coordinating Access Authorization across Multiple Systems at Different Mutual Trust Levels," filed May 19, 2017, which is assigned to the assignee hereof and the contents of which are hereby incorporated by reference.

BACKGROUND

Field

Embodiments presented herein generally relate to systems for authorization protocols that allow software applications to gain access to protected electronic resources. More specifically, systems are disclosed for coordinating processes between multiple network devices with different mutual trust levels to authorize an application to access a protected resource.

Related Art

Through the Internet, users can access many different services provided by different vendors. For example, software as a service (SaaS) is a software distribution model in which a third-party provider hosts applications and makes those applications accessible to users via the Internet. In some cases, a user may wish to import data provided by one Internet service into a different Internet service (or a local standalone application) for processing and analysis. To facilitate data transfer between different applications across the Internet, some software vendors provide open application programming interfaces (APIs) that allow Internet applications to be accessed programmatically by authorized third-party programs.

To allow applications to access data from other services, a user typically has to authenticate with the services that provide the data. To authenticate, the user typically has to provide at least a username and a password (or more, if two-factor authentication (2FA) or multi-factor authentication (MFA) is used). For security and convenience, a user may not want to provide the user's authentication credentials for a first service to other services even if the user wants the other services to be able to access some data or functionality of the first service. Rather, the user would prefer to authorize the other services to access the pertinent data or functionality through a channel that does not require compromising the user's credentials for the first service.

The Internet Engineering Task Force (IETF) has developed the Open Authorization (OAuth) 2.0 protocol to allow a user to authorize third-party applications to access protected Internet resources without disclosing the user's credentials for the Internet resources to the third-party applications.

SUMMARY

One embodiment of the present disclosure includes a method for authorizing an application to access data provided by a resource server. The method generally includes receiving, from a beneficiary application via a network, an initiation message requesting the beneficiary application be authorized to access data hosted at a resource server connected to the network; verifying that a valid session exists between the application and an agent executing at a user device; instructing the agent to obtain an authorization code on behalf of the application from an authorization server associated with the resource server; receiving the authorization code from the agent; obtaining an access token and a refresh token from the authorization server based on the authorization code; generating a partner authorization (PA) token associated with the access token and the refresh token; and transmitting the PA token to the beneficiary application to allow the beneficiary application to retrieve the access token.

Another embodiment provides a computer-readable storage medium having instructions, which, when executed on a processor, perform the method for authorizing an application to access data provided by a resource server.

Still another embodiment of the present disclosure includes a processor and a memory storing a program which, when executed on the processor, performs the method for authorizing an application to access data provided by a resource server.

DETAILED DESCRIPTION

Figure 1:
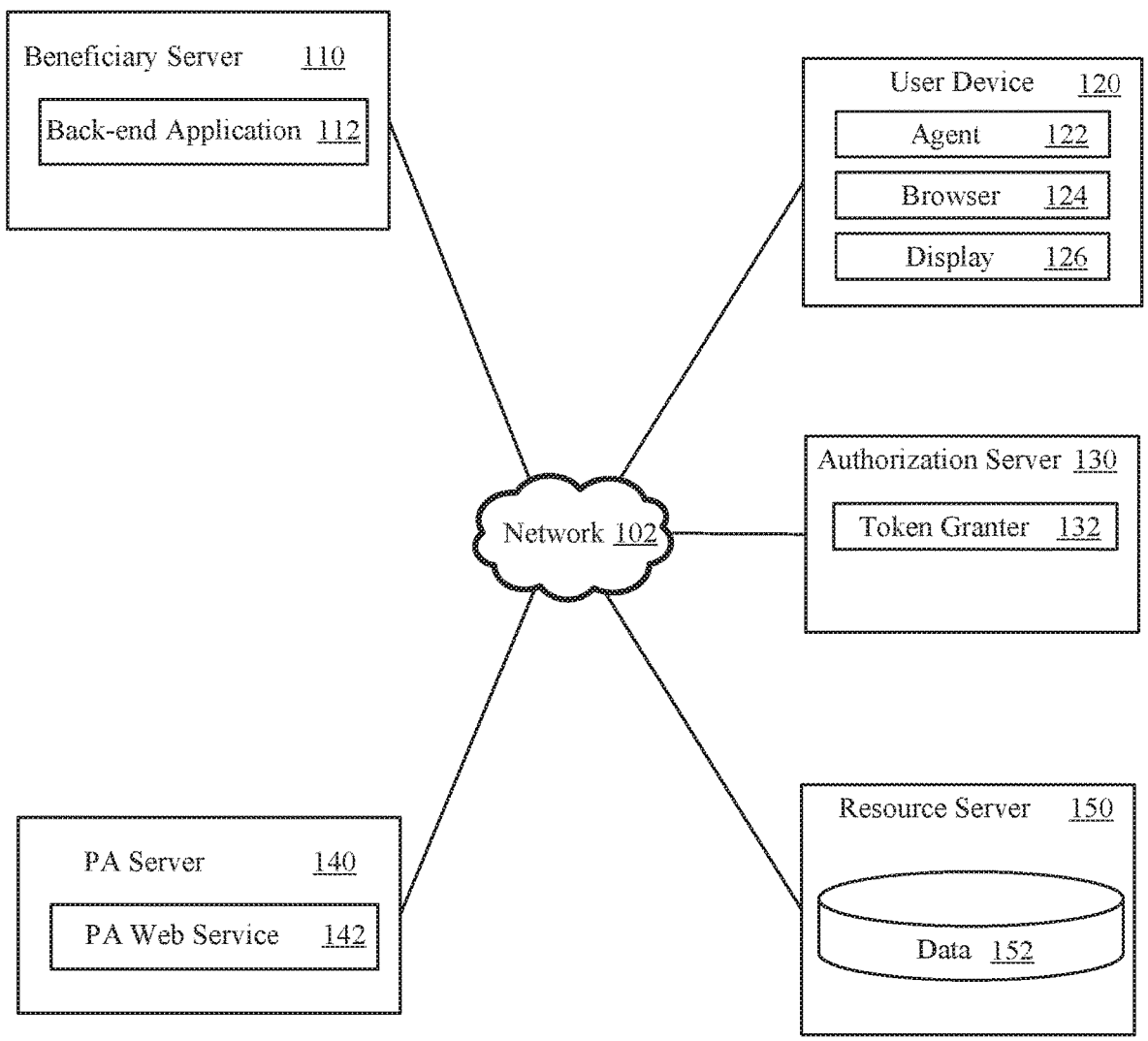
FIG. 1 illustrates a computing network environment wherein technology of the present disclosure can operate, according to one embodiment.

Authorization protocols such as the Open Authorization (OAuth) 2.0 protocol can be implemented to authorize applications to access protected resources (e.g., via web application programming interfaces (APIs)). In existing systems that apply the OAuth2 protocol, an application redirects a user to an authorization server. The authorization server collects login information from the user and the application exchanges several protocol-defined communications with the authorization server. If the login information is valid, the authorization server ultimately sends an access token and a refresh token to the application. The application stores the access token (which generally includes an expiration date or time) and the refresh token. The application can then access the protected resources by sending the access token to a resource server through which the resources are available for authorized parties. Once the access token expires, the application sends the refresh token to the authorization server. In response, the authorization server sends a new access token and a new refresh token.

One disadvantage, however, is that an application typically has to be coded in a way that is compatible with the protocol. For example, the application has to be able to compose messages that conform to the protocol and manage the tokens received from the authorization server. Thus, when the protocol changes, the application code has to be updated to ensure compatibility. Furthermore, to access data from multiple providers that implement different protocols or variations of the same protocol, the application must have code that is compatible with each different protocol. An application that analyzes a user's personal finances, for example, may benefit from having access to data from each bank with which the user has an account. If each bank uses a different protocol to govern network access to the user's data, the application has to support each different protocol. Furthermore, the application has to be updated each time one of the banks changes the protocol used or introduces deviations to the existing protocol implementation. As a result, software programmers may have to dedicate a great deal of time and effort to keep the application compatible with each bank's authorization server.

Embodiments presented herein provide a partner authentication (PA) system that addresses this problem. Embodiments of the PA system coordinate an authorization process for an application. During the authorization process, the PA system exchanges a series of messages with the application seeking an access token for a protected resource, an authorization server associated with the protected resource, and an agent executing on a device (e.g., in a browser) accessed by a user who wants the application to access the protected resource. The PA system brokers network trust levels between the application, the authorization server, and the agent via short-lived tokens (e.g., a request token and a response token) and a state identifier included in messages throughout the authorization process. By using short-lived tokens, the PA system ensures network trust levels are not violated and that security tokens associated with the user are not compromised during the authorization process to allow a third-party application to access and use information from the protected resource.

For security purposes, the PA system generally does not have direct access to the user's credentials (e.g., username and password) for the authorization server. However, the PA system can indirectly detect that the user's credentials are compromised if a different user seeks to authorize a third-party application to access the protected resource. Specifically, during the authorization process, the PA system can detect whether there is any inconsistency between the users identified by secure user identifiers received from the application and the authorization server. For example, suppose a user logged in to an application legitimately authorizes the application to access a protected resource via the authorization process of the PA system. During that process, the PA system receives secure identifiers of the user in separate messages from the application and the authorization server. Later, suppose the user's credentials for the authorization server are compromised and a fraudster logged in to the application attempts to authorize the application to access the protected resource. During the authorization process, the PA system can detect that the secure user identifier received from the authorization server matches the secure user identifier received from the authorization server during the authorization process for the application. However, the PA system can also detect that the secure user identifier received from the application is different from the identifier that was received from the application when the application was previously authorized. In this manner, the PA system determines that there is a discrepancy between the combination of user identifiers and that someone other than the genuine user (e.g., the fraudster) used the user's credentials to authenticate with the authorization server. The PA system can flag the second attempt to authorize the application and notify the user (e.g., via email) of the discrepancy and of the actions that the user needs to take to revoke his or her tokens, reset his or her password with the authorization server, and reauthorize the application.

Also, the PA system and the agent communicate with the authorization server on behalf of the application throughout the authorization process. This obviates the need for the application to be compatible with any authorization protocol applied by the authorization server. Thus, if the authorization server begins to use a different protocol, the PA system and the agent can be updated to without requiring any updates to the application.

At the completion of the authorization process, the PA system receives an access token and a refresh token from the server on behalf of the application and sends a partner authorization (PA) token to the application. From that point on, when the application seeks access to data stored at the resource server, the application sends the PA token to the PA system. In response, if the access token currently stored at the PA token is still valid, the PA system sends the access token to the application. Otherwise, the PA system sends the currently stored refresh token to the authorization server and receives an updated access token and an updated access token in return. The PA system then sends the updated access token to the application. The application then includes the access token in a standard API call to the resource server for the data.

The PA system can store and manage the access tokens and refresh tokens for any number of authorization/resource servers that have data that the user wishes to make available to the application. The PA system ensures that the tokens are managed securely in single place. In addition, the PA system can invalidate the PA token when the user so requests. If the PA system receives a request for an updated access token and the request includes a PA token that has been revoked, the PA system would deny the request. Furthermore, once the user requests that the PA token be revoked, the PA system can also send a message to the authorization server to request that that access token and the refresh token also be revoked, if the authorization server supports token revocation.

FIG. 1 illustrates a computing network environment 100, according to one embodiment. As shown, the environment 100 includes a network 102, a user device 120, a beneficiary server 110, an authorization server 130, a partner authorization (PA) server 140, and a resource server 150. The user device 120 may be any type of endpoint computing device, such as a laptop computer, a desktop computer, a tablet computer, a gaming console, or a cellular phone.

The authorization server 130 and the resource server 150 are associated with an issuer entity. The issuer entity may be an institution that provides services to a user via the network 102. Those services may provide data 152 to the user through the resource server 150 once the user has been authenticated via the authorization server 130. For example, if the issuer entity is XYZ Bank, the data 152 may include transaction details (e.g., debit or credit amounts, dates, merchants, etc.), current balances, and other information associated with accounts the user has with XYZ bank. The user may login to a website for XYZ bank via a browser (or a dedicated application) executing at the user device 120. Once the authorization server 130 verifies the user's logon credentials, the user can access the data 152.

While authorization server 130 and resource server 150 are shown as separate servers in FIG. 1, other embodiments may consolidate the authorization server 130 and the resource server 150 into a single server. Also, it should be noted that functionality attributed to any of the servers shown in FIG. 1 can also be implemented across multiple servers (e.g., in cloud computing environments) without departing from the spirit and scope of the disclosure.

Beneficiary server 110 is associated with a beneficiary entity. The beneficiary entity provides a software offering to the user via the back-end application 112. The user may interact with the back-end application 112 via a front end at the user device 120, such as a page viewed in a browser or a dedicated application. For example, the back-end application 112 may be software for budget planning. In this example, the user may wish to authorize the back-end application 112 to access data 152 associated with the user (or a business entity associated with the user) directly so that the user can apply functionality of the back-end application 112 (e.g., statistical analysis, chart generation, etc.) to the data 152 without manually rekeying the information about the user's accounts with XYZ Bank into the back-end application 112.

To authorize the back-end application 112 to access the data 152 (or access other functionality made available through the resource server 150), the user logs in to the back-end application 112 via a browser 124 (or a dedicated application that serves as the front end of the back-end application 112) at the user device 120. The user selects an option (e.g., a button shown on the display 126) indicating that the user wishes to authorize the back-end application 112 to access the data 152 (or some other electronic resource) hosted at the resource server 150. The agent 122 sends an electronic request to the beneficiary server 110 via the network 102 to communicate that the user wants to authorize the back-end application 112 to access the data 152 (or other electronic resources). The request may include a token associated with the beneficiary entity (e.g., a token previously provided to the agent 122 by the beneficiary entity) so that the back-end application 112 can verify that the request originated from the user device 120. The request may also include a cookie stored in the browser 124.

Upon receiving the request, the back-end application 112 sends an initiation message to the PA Web Service 142. The initiation message may include a token associated with the PA web service 142 (e.g., an OAuth2 token previously provided to the back-end application 112 by the PA web service 142) so that the PA web service 142 can verify the initiation message originated from the back-end application 112. The initiation message requests that the PA web service provide a partner authorization (PA) token to the back-end application 112. The purpose of the PA token will be to allow the back-end application 112 to access the data 152 without requiring the back-end application 112 to be compatible with an authorization protocol used by the authorization server 130. The initiation message includes a secure user identifier for the user (i.e., a security token). The initiation message may also include the cookie from the browser 124, if such a cookie was included in the request.

Once the PA web service 142 receives the initiation message, the PA web service 142 validates the user and the beneficiary server 110 (e.g., based on the secure user identifier and an OAuth2 token previously provided to the back-end application 112 by the PA web service 142). Next, the PA web service 142 generates a request token based on the initiation message and sends the request token to the back-end application 112 in a verification-request message. The request token is not the requested PA token, but rather is a token that the back-end application 112 will send to the agent 122 and that the agent 122 will send back to the PA web service 142 in a later message to verify that the agent 122 truly is in communication with the back-end application 112.

The verification-request message also includes a state identifier (e.g., a session identifier). The state identifier is associated with the user, the beneficiary server 110, and the issuer entity so that the PA web service 142, when receiving a copy of the state identifier in a subsequent network communication, can readily determine that the communication is related to the authorization process that the user initiated to allow the beneficiary server 110 (e.g., via the back-end application 112) to access an electronic resource (e.g., the data 152) provided by the issuer entity. There are many different ways the PA web service 142 can generate the state identifier. For example, the state identifier can be a randomly generated string that the PA web service 142 associates with the user, the beneficiary server 110, and the issuer entity (e.g., in an internal mapping, such as an associative array). In another example, the PA web service 142 can input the secure user identifier, an identifier for the beneficiary server 110 (or the back-end application 112), and an identifier for the issuer entity into a cryptographic hash function (e.g., a 256-bit secure hash algorithm (SHA-256)). The output of the cryptographic hash function for the combination of identifiers can serve as the state identifier.

The verification-request message can also include a uniform resource indicator (URI) (e.g., a uniform resource locator (URL)) of the PA web service 142. The back-end application 112, upon receiving the verification-request message, forwards the request token and the URI of the PA web service 142 to the agent 122 via the network 102. For example, the back-end application 112 can forward the request token and the URI in a Hypertext Transfer Protocol (HTTP) response with a status code of 302 to redirect the agent 122 to the URI of the PA system.

Upon receiving the forwarded request token and the URI of the PA web service 142, the agent 122 sends a verification-confirmation message to the PA web service 142 via the network 102. The verification-confirmation message includes the request token that was sent to the back-end application 112 in the verification-request message. The PA web service 142 can verify that the request token received in the verification-confirmation message and the request token that was sent in the verification-request message match each other. In this manner, the PA web service 142 verifies that the agent 122 is legitimately in communication with the back-end application 112. Typically, the agent 122 sends the verification-confirmation message to the URI of the PA web service 142 (e.g., as an API call). Upon receiving the verification-confirmation message, the PA web service 142 can define a cookie that includes the state identifier.

In response to the verification-confirmation message, the PA web service 142 sends a redirect-to-issuer message to the agent 122 via the network. The redirect-to-issuer message specifies a uniform resource identifier (URI) of the authorization server 130. The redirect-to-issuer message includes the state identifier and the secure user identifier (e.g., in the cookie). In one example, the redirect-to-issuer message is an HTTP response with a status code of 302 that redirects the agent 122 to the URI of the authorization server 130.

Upon receiving the redirect-to-issuer message, the agent 122 sends an authorization request on behalf of the back-end application 112 to the authorization server 130. The authorization request notifies the authorization server 130 that the user wants the back-end application 112 to have specified access privileges relative the data 152. The authorization request includes the state identifier. The authorization request also specifies the access privileges that are being requested for the back-end application 112. In one example, the authorization request conforms to an open authorization (OAuth) protocol (e.g., the OAuth 2.0 protocol). In this example, the authorization request identifies the back-end-application 112 via a value in the OAuth client_id parameter, the level of access in the OAuth scope parameter, and the state identifier in the OAuth state parameter.

In response to the authorization request, the authorization server 130 sends a communication to the agent 122 requesting that the user authenticate (e.g., login by entering the user's credentials, such as a username and password). The communication also requests that the user indicate consent to the access privileges specified in the authorization request for the back-end application 112. The communication may be conveyed to the user, for example, via a page displayed in the browser 124. The user, upon receiving the communication via the agent 122, enters the user's authentication credentials and an indicator of consent for the access privileges via an input/output (I/O) device (e.g., the display 126 or a keyboard) in communication with the agent 122.

Next, the browser 124 sends the authentication credentials and the indicator of consent in an authentication (authN) message to the authorization server 130. After verifying that the authentication credentials are correct for the user, the authorization server 130 sends an authorization confirmation to the agent 122. The authorization confirmation includes an authorization (authZ) code, the state identifier, and the URI of the PA web service 142. In one embodiment, the authorization confirmation is an HTTP response with a status code of 302 that redirects the agent 122 to the URI (e.g., URL) of the PA web service 142.

Upon receiving the authorization confirmation, the agent 122 sends a code-transferal message to the PA web service 142 via the network 102. The code-transferal message includes the authorization code (which is associated with the resource server 150) and the state identifier. Upon receiving the code-transferal message, the PA web service 142 verifies that the state identifier received in the code-transferal message matches the state identifier that was sent to the back-end application 112 in the verification-request message. Next, the PA web service 142 sends a token-request message to the authorization server 130 via the network 102. The token-request message includes the authorization code, the secure user identifier, and the state identifier. The token-request message also requests an access token and a refresh token from the authorization server 130. In one embodiment, the token-request message conforms to an OAuth protocol (e.g., the OAuth 2.0 protocol). For example, the back-end-application 112 can be represented by the OAuth client_id parameter, the authorization code can be represented by the OAuth code parameter, and the state identifier can be represented by the OAuth state parameter.

Upon receiving the token-request message, the authorization server 130 verifies that the authorization code in the token-request message matches the authorization code that was sent to the agent 122 in the authorization confirmation. Next, the authorization server 130 sends a token-grant message to the PA web service 142 via the network 102. The token-grant message includes an access token and a refresh token issued by the token granter 132 for the back-end application 112. The token-grant message also includes a copy the state identifier so that the PA web service 142 can verify that the state identifier has not been altered.

Upon receiving the token-grant message, the PA web service 142 verifies that the state identifier included in the token-grant message matches the state identifier that was sent to the back-end application 112 in the verification-request message. Next, the PA web service 142 generates the PA token for the back-end application 112 and a response token for the agent 122 based on the token-grant message. The PA web service 142 sends a redirect-to-beneficiary message to the agent 122 via the network 102. The redirect-to-beneficiary message specifies a uniform resource identifier (URI) of the back-end application 112 and includes the response token. In one embodiment, the redirect-to-beneficiary message is an HTTP response with a status code of 302 that redirects the agent 122 to the URI of the back-end application 112. Upon receiving the redirect-to-beneficiary message, the agent 122 sends the response token to the back-end application 112 via the network 102.

Upon receiving the response token, the back-end application 112 sends a response-confirmation message to the PA web service 142 via the network 102. The response-confirmation message includes the response token. Upon receiving the response-confirmation message, the PA web service 142 verifies that the response token received in the response-confirmation message matches the response token that was sent to the agent 122 in the redirect-to-beneficiary message. Next, the PA web service 142 sends a PA-grant message to the back-end application 112 via the network 102 in response to the response-confirmation message. The PA-grant message includes the PA token.

The back-end application 112 stores the PA token. Once the PA token is stored, the back-end application 112 can access the data 152 on behalf of the user. The PA token is bound to the user in the sense that the back-end application 112 can only use the PA token to access the data 152 while the user is logged in to the back-end application 112. For example, suppose the user wants to view, analyze, or process the data 152 using functionality provided by the back-end application 112. The user first logs in to the back-end application 112 via the browser 124. The back-end application 112, upon receiving an indication (e.g., from the agent 122 or the browser 124) that the user wants to apply the functionality to the data 152, sends the PA token to the PA web service 142 in an access-token-request message. The access-token-request message requests an access token that will allow the back-end application 112 to access the data 152 at the resource server 150.

Upon receiving the access-token-request message, the PA web service 142 first verifies with the agent 122 that there is a valid session for the user (e.g., the user has logged on to the back-end application 112 through the browser 124). Next, the PA web service 142 determines whether the access token received in the token-grant message has expired. If the access token has expired, the PA web service 142 sends a refresh-request message to the authorization server 130. The refresh-request message includes the refresh token that was received in the token-grant message and requests an updated access token and an updated refresh token.

The authorization server 130 verifies that the refresh token received in the refresh-request message matches the refresh token that was sent in the token-grant message. Upon verifying the match, the token granter 132 generates an updated access token and an updated refresh token for the back-end application 112. The authorization server 130 sends the updated access token and the updated refresh token to the PA web service 142 in a refresh-grant message. The PA web service 142 sends the updated access token to the back-end application 112 in an access-token-transferal message.

Alternatively, if the access token received in the token-grant message has not yet expired, the PA web service 142 sends the access token to the back-end application 112 in the access-token-transferal message without having to obtain any updated tokens from the authorization server 120.

The back-end application 112 sends the access token (or updated access token) to the resource server 150 (e.g., in an API call) to request the data 152. The resource server 150, upon verifying that the access token is valid (e.g., has not yet expired), sends the data 152 to the back-end application 112.

In some embodiments, the PA web service 142 is configured to allow other applications provided by the beneficiary entity to use the PA token to request the access token. For example, if the back-end application 112 is part of a suite of applications the beneficiary entity provides to the user, the PA web service 142 may allow any of the applications in the suite to use the PA token. The PA web service 142 enforces access control by verifying that the user is logged in to an application before allowing the application to use the PA token to request the access token.

After the PA web service 142 has issued the PA token to the back-end application 112, the user can request that the PA token be revoked. Upon receiving the request, the PA web service 142 revokes the PA token and sends a message to the authorization server 130 to request that that access token and the refresh token also be revoked.

Figure 2:
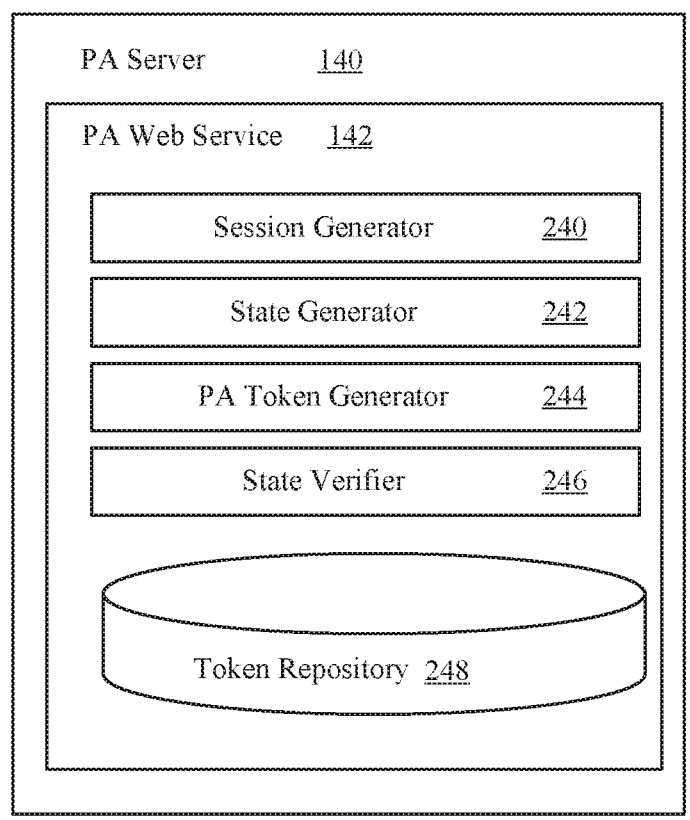
FIG. 2 illustrates a partner authorization (PA) web server and a partner authorization (PA) web service in detail, according to one embodiment.

FIG. 2 illustrates the PA web server 140 and the PA web service 142 in greater detail, according to one embodiment. As shown, the PA web service 142 includes include a session generator 242, a state generator 242, a PA token generator 244, a state verifier 246, and a token repository 248.

The session generator 240 generates session identifiers for communication sessions that occur between the PA web service 142 over the network 102. In one example, the session generator 240 generates the request token included in the verification-request message and generates the response token included in the redirect-to-beneficiary message.

The state generator 242 generates the state identifier included in the verification-request message. For example, the state generator 242 can input the secure user identifier, an identifier for the beneficiary entity (or the back-end application 112), and an identifier for the issuer entity into a cryptographic hash function. The output of the cryptographic hash function for the input can serve as the state identifier (along with other information, in some examples).

The PA token generator 244 generates the PA token included in the PA-grant message. The PA token can be generated in many different ways. For example, the PA token can be a randomly generated sequence of characters or a sequence of characters output by a cryptographic hash function that receives an identifier (e.g., of the user or the back-end application 112) as input.

The state verifier 246 verifies that the state identifier included in messages received at the PA web service 142 (e.g., in the code-transferal message and the token-grant message) matches the state identifier that was sent from the PA web service 142 in the in the verification-request message. If a mismatch is detected at any stage in the authorization process, the state verifier 246 alerts the PA web service 142 that the authorization process should be stopped.

The token repository 248 stores the PA token, the access token, and the refresh token. Since the access token will expire after a predetermined amount of time, the access token and the refresh token are periodically updated (e.g., as described with respect to FIG. 1).

Figure 3A:
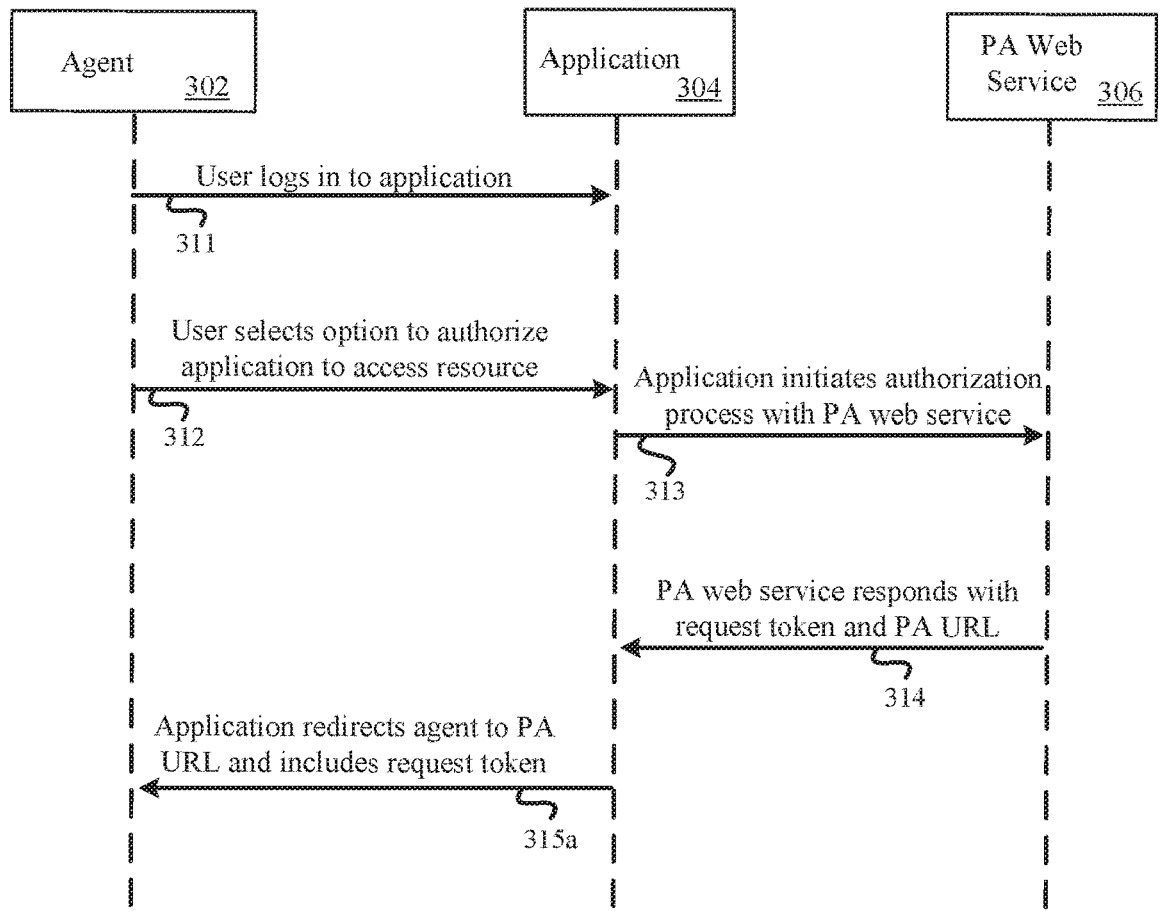
FIG. 3A is a diagram of a first signal flow for an authorization process, according to one embodiment.

FIG. 3A is a diagram 300A of a first signal flow for an authorization process, according to one embodiment. The agent 302 may, for example, be a browser agent executing at a computing device connected to a network. The application 304 may be a software application executing at a server connected to the network. The application 304 may be provided by a software vendor or some other type of beneficiary entity. The PA web service 306 may be a service executing at another server connected to the network. The PA network service 306 operates as a broker between devices and programs that have varying levels of trust with each other.

To commence the authorization process, the user logs in by sending the user's authentication credentials for the application 304 from the agent 302 to the application 304 in message 311. After logging in to the application 304 from the agent 302, the user selects an option to authorize the application 304 to access an electronic resource (e.g., data or functionality available through a web API) provided by an issuer entity. In message 312, the agent 302 sends the selection to the application 304 in a communication. In some embodiments, a token associated with the agent 302 (e.g., an OAuth2 token previously provided to the agent 302 by the beneficiary entity) is also sent so that the application 304 can verify that the communication originated from the agent 302.

In message 313, the application 304 sends a communication to the PA web service 306 to initiate an authorization process for the application 304 to access the electronic resource. The communication may include a token associated with the beneficiary entity or the application 304 (e.g., an OAuth2 token previously provided to the application 304 by the PA web service 306) so that the PA web service 306 can verify that the communication originated from the application 304.

In message 314, the PA web service 306 sends a response to the application 304. The response includes a request token, a URL of the PA web service 306, and a state identifier. Upon receiving this response, the application 304 sends a redirect communication to the agent 302. The redirect communication invites the agent 302 to send an API call to the URL of the PA web service 306 and to include the request token in the API call to demonstrate to the PA web service 306 that the agent 302 is in communication with the application 304.

Figure 3B:
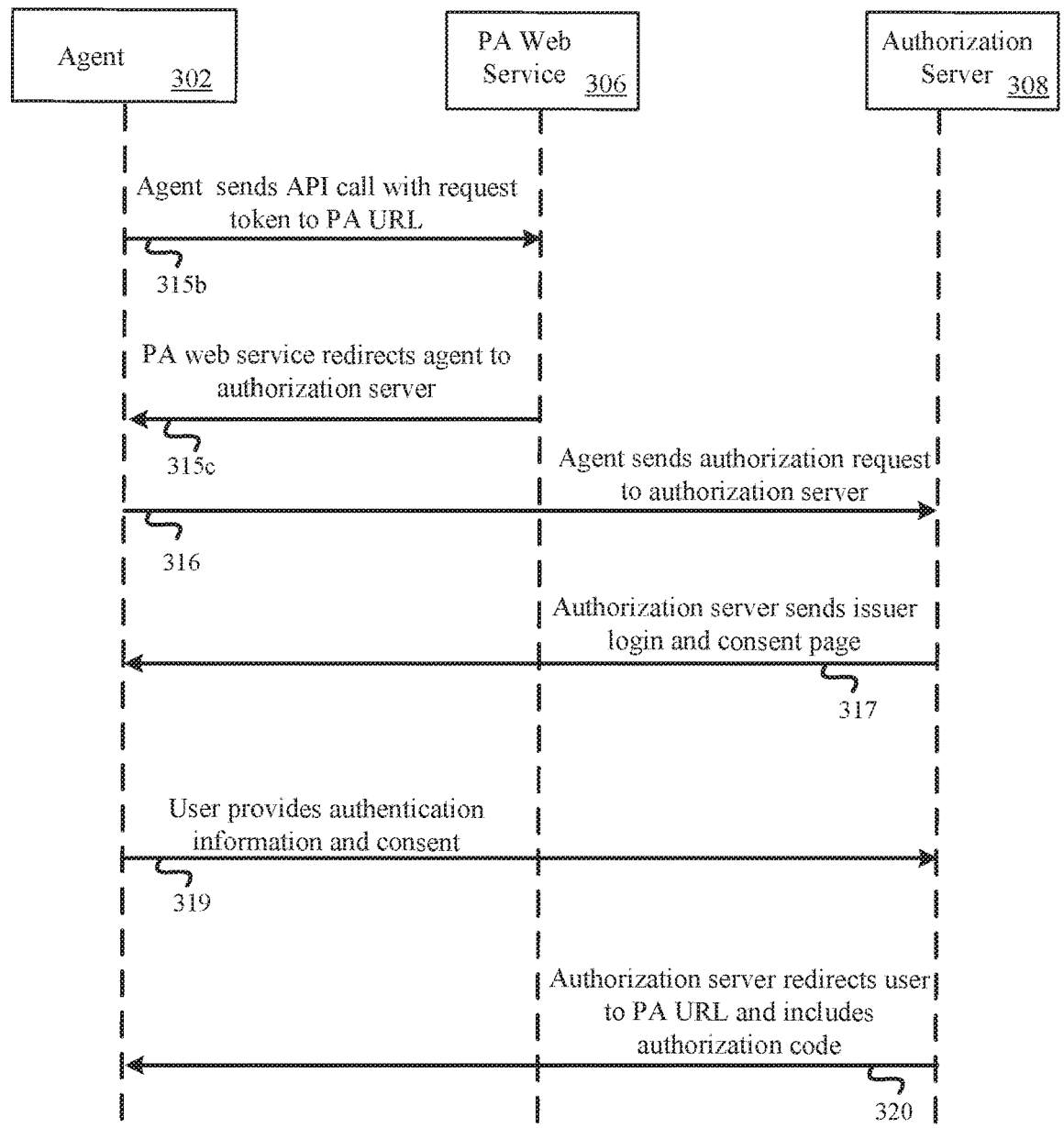
FIG. 3B is a diagram of a second signal flow for the authorization process, according to one embodiment.

FIG. 3B is a diagram 300B of a second signal flow for the authorization process, according to one embodiment. The signal flow in diagram 300B commences after message 315*a* shown in diagram 300A. In message 315*b*, the agent 302 sends an API call to the URL of the PA web service 306. The API call includes the state identifier and the request token. After verifying that the request token included in the API call matches the request token that was sent to the application 304 in message 314, the PA web service 306 sends an API response to the agent 302 in message 315*c*. The API response includes the state identifier and redirects the agent 302 to a URL of the authorization server 308. The authorization server 308 is provided by the issuer entity to facilitate the authorization process by regulating access to the electronic resource.

In message 316, the agent 302 sends an authorization request to the URL of the authorization server 308. The authorization request includes the state identifier and a secure user identifier (which identifies the user). In message 317, the authorization server 308 sends a response to the authorization request. The response sends a page inviting the user to login with the authorization server and indicate that the user consents to authorizing the application 304 to access the electronic resource.

The user enters the user's authentication information (e.g., login credentials) for the authorization server (e.g., for an account the user has with the issuer entity) and provides the requested indication of consent. In message 319, the agent 302 sends the user's authentication information and the indication of consent to the authorization server 308.

Once the authorization server 308 verifies the authentication information is valid, the authorization server sends a redirect communication to the agent 302 in message 320. The redirect communication redirects the agent 302 to the URL of the PA web service 306. The redirect communication also includes an authorization code and the state identifier.

Figure 3C:
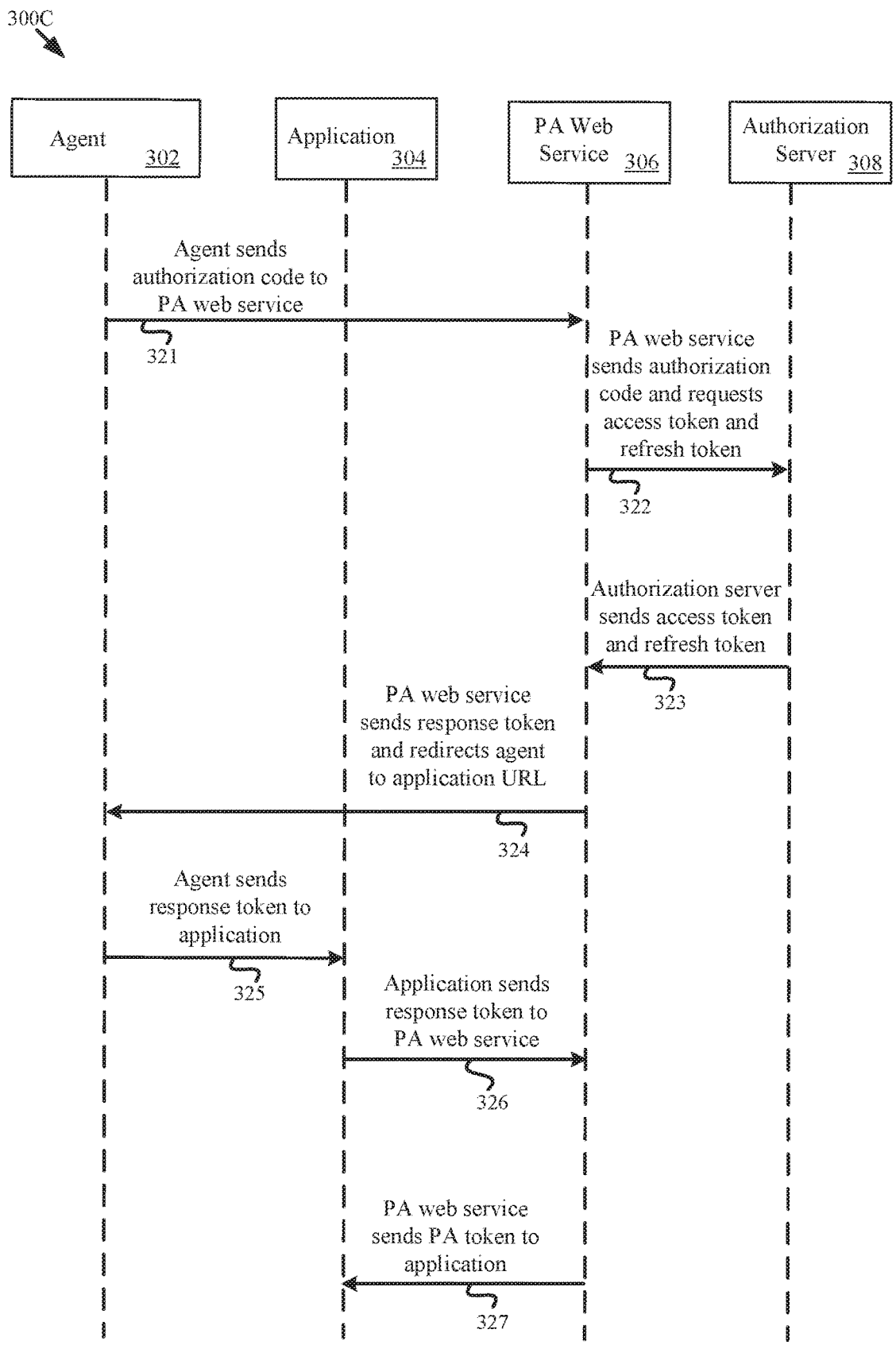
FIG. 3C is a diagram of a third signal flow for the authorization process, according to one embodiment.

FIG. 3C is a diagram 300C of a third signal flow for the authorization process, according to one embodiment. The signal flow in diagram 300C commences message 320 shown in diagram 300B. In message 321, the agent 302 sends the authorization code and the state identifier to the URL of the PA web service 306. The PA web service 306 verifies that the state identifier has not been changed.

In message 322, the PA web service 306 sends a communication to the authorization server 308 to request an access token and a refresh token. The communication includes the authorization code and the state identifier. The authorization server 308 verifies that the authorization code received in message 322 matches the authorization code sent in message 320. The authorization server 308 also verifies that the state identifier received in message 322 matches the state identifier sent in message 320. Once both the authorization code and the state identifier have been verified, the authorization server generates the requested access token and the requested refresh token.

In message 323, the authorization server 308 sends the access token, the request token, and the state identifier to the PA web service 306. Upon verifying that the state identifier received in message 323 matches the state identifier sent in message 314, the PA web service 306 generates a PA token for the application 304. The PA web service 306 also generates a response token. The response token will allow the PA web service 306 to ensure that the agent 302 is still in communication with the application 304 without revealing the PA token to the application 304.

In message 324, the PA web service 306 sends a communication to redirect the agent 302 to the application 304. The communication includes the response token, the URL of the application 304, and the state identifier.

In message 325, the agent 302 sends the response token and the state identifier to the application 304 in a communication. (In some embodiments, the communication also includes the token associated with the agent 302 that was sent in message 312.) In message 326, the application 304 sends the response token and the state identifier to the PA web service 306. The PA web service 306 verifies that the response token received in message 326 matches the response token sent in message 324. The PA web service 306 also verifies that the state identifier received in message 326 matches the state identifier sent in message 314. If both the response token and the state identifier are successfully verified, the PA web service 306 sends the PA token to the application 304 in message 327.

Figure 4:
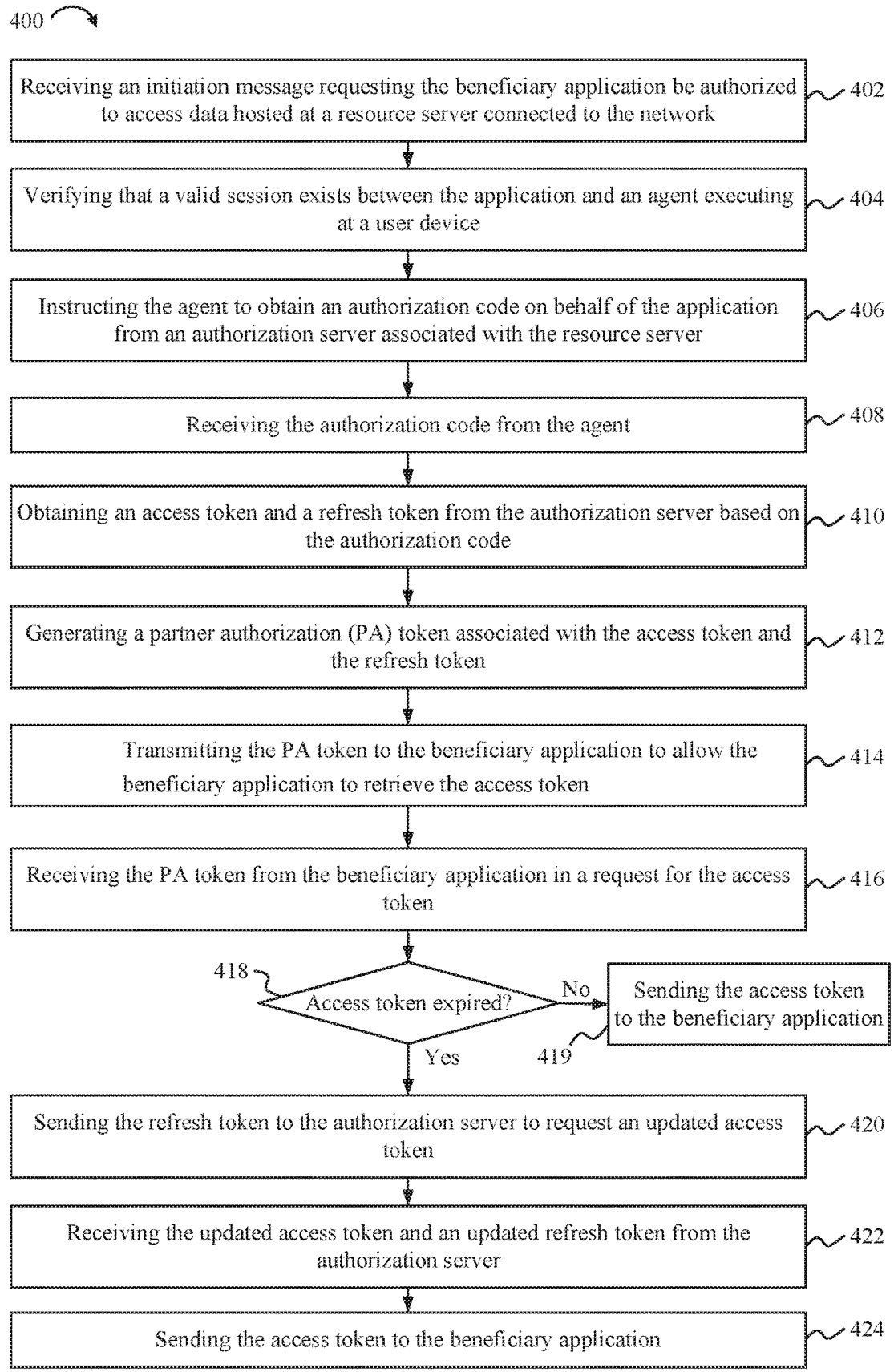
FIG. 4 illustrates example operations for a partner authorization (PA) system that coordinates between an agent, an application, and an authorization server entity in a process designed to allow a user to authorize the application to access data available at a resource server, according to one embodiment.

FIG. 4 illustrates example operations 400 for a partner authorization (PA) system, according to one embodiment. The operations 400 can be implemented as a method or the operations 400 can be executed as instructions on a machine (e.g., by one or more processors), where the instructions are included on at least one non-transitory computer-readable storage medium.

As illustrated in block 402, the operations 400 include receiving, from a beneficiary application via a network, an initiation message requesting the beneficiary application be authorized to access data hosted at a resource server connected to the network.

In block 404, the operations 400 include verifying that a valid session exists between the application and an agent executing at a user device.

In block 406, the operations 400 include instructing the agent to obtain an authorization code on behalf of the application from an authorization server associated with the resource server.

In block 408, the operations 400 include receiving the authorization code from the agent.

In block 410, the operations 400 include obtaining an access token and a refresh token from the authorization server based on the authorization code.

In block 412, the operations 400 include generating a partner authorization (PA) token associated with the access token and the refresh token.

In block 414, the operations 400 include transmitting the PA token to the beneficiary application to allow the beneficiary application to retrieve the access token.

In block 416, the operations 400 include receiving the PA token from the beneficiary application in a request for the access token.

In block 418, the operations 400 include determining whether the access token has expired. If the access token has not expired, in block 419, the operations 400 include sending the access token to the beneficiary application. If the access token has expired, in block 420, the operations 400 include sending the refresh token to the authorization server to request an updated access token. In block 422, the operations 400 include receiving the updated access token and an updated refresh token from the authorization server. In block 424, the operations 400 include sending the access token to the beneficiary application.

Figure 5:
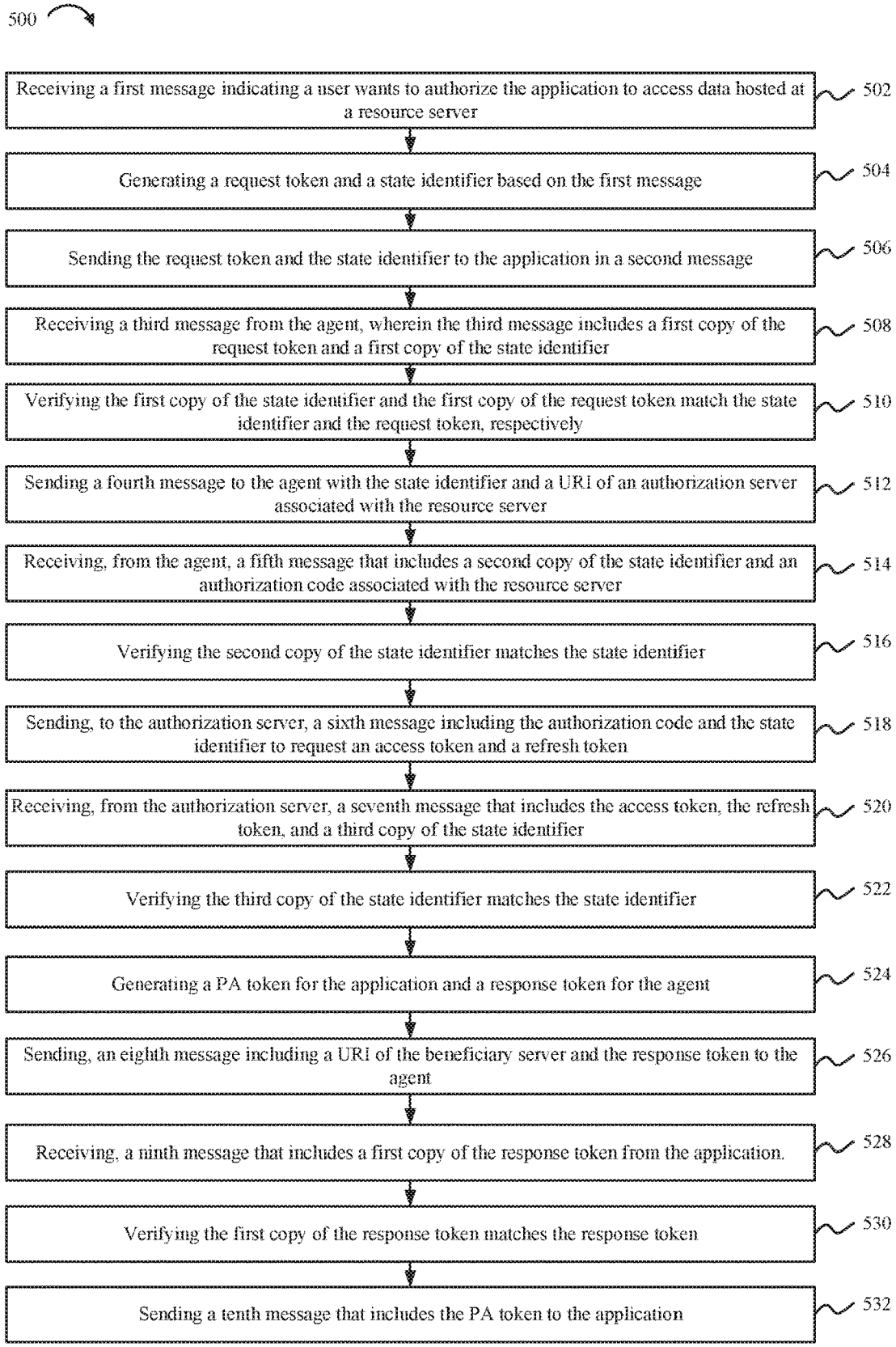
FIG. 5 illustrates example operations for sharing an authorization token with a beneficiary software application, according to one embodiment.

FIG. 5 illustrates example operations 500 that show how the blocks 402-416 of operations 400 can be implemented in greater detail, according to one embodiment. The operations 500 can be implemented as a method or the operations 500 can be executed as instructions on a machine (e.g., by one or more processors), where the instructions are included on at least one non-transitory computer-readable storage medium. In the description of FIG. 5, ordinal designations (e.g., "first," "second," "third," etc.) are used for messages that are either sent from or received by the PA web system. Communications not sent from or received by the PA web system are not described with ordinal designations. These designations are not intended to be limiting. For example, a single message may be separated into multiple messages or additional messages may be passed in between two messages that have consecutive ordinal designations.

Before the example operations 500 take place, a user at a client device (e.g., a laptop computer or another computing device) logs in to an application hosted at a beneficiary server via a network (e.g., the Internet). The user selects an option in the application indicating that the user wishes to authorize the application to access data (or some other electronic resource) hosted at a resource server provided by an issuer entity. A software agent at the client device (e.g., a browser agent or a standalone agent) sends a request to the beneficiary server to communicate that the user wants to authorize the application to access the electronic resource. Part or all of the request may be formatted in a metadata language (e.g., FI).

As illustrated in block 502, the operations 500 include receiving, at the PA system from the application hosted at the beneficiary server, a first message indicating the user wants to authorize the application to access the data. In one example, this first message may be considered a request for a partner authorization (PA) token from the PA system. The PA token, once provided, will allow the application to retrieve access tokens from the PA system to access the data hosted at the resource server. The first message includes a secure user identifier associated with the user.

In block 504, the operations 500 include generating a request token and a state identifier based on the first message. The request token is not the requested PA token, but rather is a token that the application will send to the agent and that the agent will send back to the PA system at a later point in the operations 500 to verify that the agent truly is in communication with the application (e.g., that a valid session exists between the agent and the application) and that the user does want the application to have access to the data hosted at the resource server.

In block 506, the operations 500 include sending, to the application in a second message via the network, the request token and the state identifier. The second message can also include a uniform resource indicator (URI) (e.g., a uniform resource locator (URL)) of the PA system. The application, upon receiving the second message, forwards the request token and the URI of the PA system to the agent. For example, if the URI of the PA system is a URL, the application can forward the request token and the URL in a Hypertext Transfer Protocol (HTTP) response with a status code of 302 to redirect the agent to the URL of the PA system.

In block 508, the operations 500 include receiving, from the agent at the client device via the network, a third message. The third message includes the request token that was sent to the application in block 506. Typically, the agent sends the third message to the URI of the PA system. Upon receiving the third message, the PA system can define a cookie that includes the state identifier, the secure user identifier, and possibly other information.

In block 510, the operations 500 include verifying the first copy of the state identifier received in the third message matches the state identifier sent in the second message and verifying the first copy of the request token received in the third message matches the request token sent in the second message to confirm the agent is in communication with the application.

In block 512, the operations 500 include sending, to the agent via the network in response to the third message, a fourth message. The fourth message specifies a uniform resource identifier (URI) of an authorization server associated with the resource server. The issuer entity, for example, may provide the authorization server to facilitate the operations 500 so that the application, if properly authorized, will be able to access the data in accordance with the user's wishes. The fourth message can also include the cookie. If the URI of the authorization server is a URL, the fourth message can be an HTTP response with a status code of 302 that redirects the agent to the URL of the authorization server. The fourth message also includes the state identifier.

The agent, upon receiving the fourth message, sends an authorization request for the application to the authorization server. The authorization request notifies the authorization server that the user would like for the application to have a specified level of access to the data (or other electronic resource) that is available through the resource server. The authorization request identifies the user (e.g., by including the secure user identifier) and the requested level of access. The authorization request also includes the state identifier. In one embodiment, the authorization request conforms to the OAuth 2.0 protocol. For example, the application can be represented by the OAuth client_id parameter, the URI can be represented by the OAuth redirect_uri parameter, the level of access can be represented by the OAuth scope parameter, and the state identifier can be represented by the OAuth state parameter.

In response to the authorization request, the authorization server sends a communication to the agent that requests that the user authenticate (e.g., login by entering the user's credentials, such as a username and password). The communication also requests that the user indicate consent to the level of access specified in the authorization request. The communication may be, for example, a page to display (e.g., in a browser). The user, upon receiving the communication via the agent, enters the user's authentication credentials and an indicator of consent for the access level via an input/output (I/O) device (e.g., a touch screen or a keyboard) in communication with the agent.

Next, the authentication credentials and the indicator of consent are sent to the authorization server in an authentication (AuthN) message. After verifying that the authentication credentials are valid for the user, the authorization server sends an authorization confirmation to the agent. The authorization confirmation includes an authorization (authZ) code, the state identifier, and the URI of the PA system. In one embodiment, the authorization confirmation is an HTTP response with a status code of 302 that redirects the agent to the URI (e.g., URL) of the PA system.

In block 514, the operations 500 include receiving, from the agent at the client device via the network, a fifth message. The fifth message includes a second copy of the state identifier and the authorization code (which is associated with the resource server).

In block 516, the operations 500 include verifying the second copy of the state identifier received in the fifth message matches the state identifier sent in the second message.

In block 518, the operations 500 include sending, to the authorization server via the network, a sixth message. The sixth message includes the authorization code, the state identifier, and the secure user identifier. The sixth message also requests an access token and a refresh token from the authorization server 130. In one embodiment, the sixth message conforms to the OAuth 2.0 protocol. For example, the application can be represented by the OAuth client_id parameter, the authorization code can be represented by the OAuth code parameter, and the state identifier can be represented by the OAuth state parameter.

In block 520, the operations 500 include receiving, from the authorization server via the network, a seventh message. The seventh message includes the access token, the refresh token, and a third copy of the state identifier.

In block 522, the operations 500 include verifying the third copy of the state identifier received in the seventh message matches the state identifier sent in the second message.

In block 524, the operations 500 include generating a PA token for the application and a response token for the agent based on the seventh message.

In block 526, the operations 500 include sending, to the agent via the network, an eighth message. The eighth message specifies a uniform resource identifier (URI) of the beneficiary server and includes the response token. In one embodiment, the eighth message is an HTTP response with a status code of 302 that redirects the agent to the URI (e.g., URL) of the beneficiary server. Upon receiving the eighth message, the agent sends the response token to the application hosted at the beneficiary server.

In block 528, the operations 500 include receiving, via the network from the application at the beneficiary server, a ninth message. The ninth message includes a first copy of the response token.

In block 530, the operations 500 include verifying the first copy of the response token received in the ninth message matches the response token sent in the eighth message to confirm the application is in communication with the agent.

In block 532, the operations 500 include sending, via the network to the application in response to the ninth message, a tenth message. The tenth message includes the PA token. In one embodiment, the application is associated with a group of applications provided by the beneficiary entity and the PA token can be used by any application in the group to access the data at the resource server.

Figure 6:
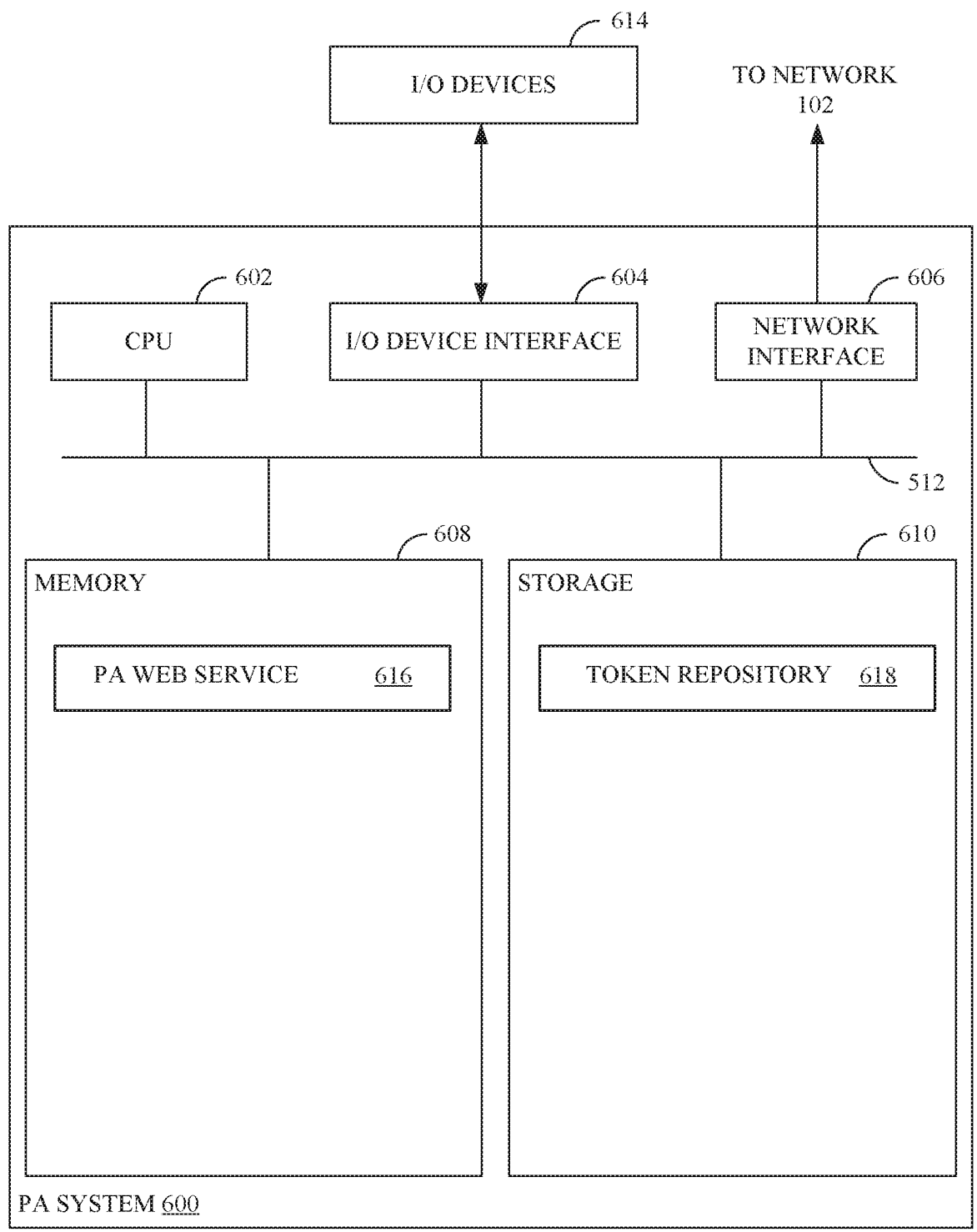
FIG. 6 illustrates a partner authorization (PA) system that coordinates between an agent, an application, and an authorization server entity in a process designed to allow a user to authorize the application to access data available at a resource server, according to an embodiment.

FIG. 6 illustrates a partner authorization (PA) system 600 that functions as a broker between an agent at a user device, an application provided by a beneficiary entity, and an authorization server provided by an issuer entity in a process designed to allow a user to authorize the application to access data available at a resource server associated with the issuer entity, according to an embodiment. As shown, the PA system 600 includes, without limitation, a central processing unit (CPU) 602, at least one I/O device interface 604 which may allow for the connection of various I/O devices 614 (e.g., keyboards, displays, mouse devices, pen input, speakers, microphones, motion sensors, etc.) to the PA system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 can represent a single CPU, multiple CPUs, a single CPU having multiple processing cores, and the like. Additionally, the memory 608 represents random access memory. Furthermore, the storage 610 may be a disk drive. Although shown as a single unit, the storage 610 may be a combination of fixed or removable storage devices, such as fixed disc drives, removable memory cards or optical storage, network attached storage (NAS), or a storage area-network (SAN). As shown, memory 608 includes the PA web service 616 and storage 610 includes the token repository 618.

To authorize the application to access data at the resource server, the user logs in to the application from the agent (which is executing at a user device). The user indicates that the user wishes to authorize the application to access the data hosted at the resource server. The agent sends an electronic request to the application to communicate that the user wants to authorize the application to access the data.

Upon receiving the request, the application sends a first message to the PA Web Service 616. The first message indicates the user wants to authorize the application to access the data. Once the PA web service 616 receives the first message, the PA web service 616 generates a request token based on the first message and sends the request token to the application in a second message. The second message also includes a state identifier. The second message can also include URL of the PA web service 616. The application, upon receiving the second message, sends the request token and the URL of the PA web service 616 to the agent.

Upon receiving the second message, the agent sends a third message to the PA web service 616. The third message includes the request token that was sent to the application in the second message. The PA web service 616 can verify that the request token received in the third message and the request token that was sent in the second message match each other. In response to the third message, the PA web service 616 sends a fourth message to the agent. The fourth message includes a URL of the authorization server and the state identifier.

Upon receiving the fourth message, the agent sends an authorization request on behalf of the application to the authorization server. The authorization request notifies the authorization server that the user wants the application to have access to the data.

In response to the authorization request, the authorization server sends a communication to the agent requesting that the user authenticate with the authorization server. The user, upon receiving the communication via the agent, provides the user's authentication credentials.

Next, the authentication credentials are sent to the authorization server in an authentication message. After verifying that the authentication credentials are valid for the user, the authorization server sends an authorization confirmation to the agent. The authorization confirmation includes an authorization code, the state identifier, and the URL of the PA web service 616.

Upon receiving the authorization confirmation, the agent sends a fifth message to the PA web service 616. The fifth message includes the authorization code and the state identifier. Upon receiving the fifth message, the PA web service 616 verifies that the state identifier received in the fifth message matches the state identifier that was sent to the application in the second message. Next, the PA web service 616 sends a sixth message to the authorization server. The sixth message includes the authorization code and the state identifier. The sixth message also requests an access token and a refresh token from the authorization server.

Upon receiving the sixth message, the authorization server verifies that the authorization code in the seventh message matches the authorization code that was sent to the agent in the authorization confirmation. Next, the authorization server sends a seventh message to the PA web service 616. The seventh message includes an access token and a refresh token issued by the authorization server for the application. The seventh message also includes a copy the state identifier.

Upon receiving the seventh message, the PA web service 616 verifies that the state identifier included in the seventh message matches the state identifier that was sent to the application in the second message. Next, the PA web service 616 generates the PA token for the application and a response token for the agent based on the seventh message and stores the PA token, the access token, and the refresh token in the token repository 618. The PA web service 616 sends an eighth message to the agent. The eighth message specifies a URL of the application and includes the response token. Upon receiving the eighth message, the agent sends the response token to the application.

Upon receiving the response token, the application sends a ninth message to the PA web service 616. The ninth message includes the response token. Upon receiving the ninth message, the PA web service 616 verifies that the response token received in the ninth message matches the response token that was sent to the agent in the eighth message. Next, the PA web service 616 sends a tenth message to the application in response to the ninth message. The tenth message includes the PA token.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
receiving, from a beneficiary application via a network, an initiation message requesting the beneficiary application be authorized to access data hosted at a resource server connected to the network;
verifying that a valid session for a user exists between the beneficiary application and an agent executing at a user device;
instructing the agent to obtain an authorization code on behalf of the beneficiary application from an authorization server associated with the resource server;
receiving the authorization code from the agent;
obtaining an access token and a refresh token from the authorization server based on the authorization code;
generating a partner authorization (PA) token associated with the access token and the refresh token; and
transmitting the PA token to the beneficiary application to allow the beneficiary application to retrieve the access token when the user is logged in to the beneficiary application.

2. The method of claim 1, further comprising:
receiving the PA token from the beneficiary application in a request for the access token; and
sending the access token to the beneficiary application.

3. The method of claim 1, further comprising:
receiving the PA token from the beneficiary application in a request for the access token;
verifying, via a communication from the agent, that the user is logged in to the beneficiary application;
determining the access token has expired;
sending the refresh token to the authorization server to request an updated access token;
receiving the updated access token and an updated refresh token from the authorization server; and
sending the access token to the beneficiary application.

4. The method of claim 1, wherein verifying that the valid session exists between the beneficiary application and the agent comprises:
generating a request token and a state identifier based on the initiation message;
sending, to the beneficiary application in a verification-request message via the network, the request token and the state identifier;
receiving, from the agent via the network, a verification-confirmation message, wherein the verification-confirmation message includes a first copy of the request token and a first copy of the state identifier;
verifying the first copy of the state identifier received in the verification-confirmation message matches the state identifier sent in the verification-request message; and
verifying the first copy of the request token received in the verification-confirmation message matches the request token sent in the verification-request message to confirm the agent is in communication with the beneficiary application.

5. The method of claim 4, wherein instructing the agent to obtain the authorization code comprises:
sending, to the agent via the network in response to the verification-confirmation message, a redirect-to-issuer message, wherein the redirect-to-issuer message includes the state identifier and specifies a uniform resource identifier (URI) of an authorization server associated with the resource server;
receiving, from the agent at a client device via the network, a code-transferal message that includes a second copy of the state identifier and an authorization code associated with the resource server; and
verifying the second copy of the state identifier received in the code-transferal message matches the state identifier sent in the verification-request message.

6. The method of claim 5, wherein obtaining an access token from the authorization server based on the authorization code comprises:
sending, to the authorization server via the network, a token-request message requesting an access token and a refresh token, wherein the token-request message includes the authorization code and the state identifier;
receiving, from the authorization server via the network, a token-grant message that includes the access token and the refresh token; and
verifying a third copy of the state identifier received in the token-grant message matches the state identifier sent in the verification-request message.

7. The method of claim 6, further comprising:
generating a response token for the agent based on the token-grant message
sending, to the agent via the network, an redirect-to-beneficiary message, wherein the redirect-to-beneficiary message specifies a uniform resource identifier (URI) of a beneficiary server on which the beneficiary application executes and includes the response token;
receiving, via the network from the beneficiary application at the beneficiary server, a response-confirmation message, wherein the response-confirmation message includes a first copy of the response token;
verifying the first copy of the response token received in the response-confirmation message matches the response token sent in the redirect-to-beneficiary message to confirm the beneficiary application is in communication with the agent; and
sending, via the network to the beneficiary application in response to the response-confirmation message, a PA-grant message, wherein the PA-grant message includes the PA token.

8. A system comprising:
one or more processors; and
memory storing one or more applications that, when executed on the one or more processors, perform an operation comprising:
receiving, from a beneficiary application via a network, an initiation message requesting the beneficiary application be authorized to access data hosted at a resource server connected to the network;
verifying that a valid session for a user exists between the beneficiary application and an agent executing at a user device;
instructing the agent to obtain an authorization code on behalf of the beneficiary application from an authorization server associated with the resource server;
receiving the authorization code from the agent;
obtaining an access token and a refresh token from the authorization server based on the authorization code;
generating a partner authorization (PA) token associated with the access token and the refresh token; and
transmitting the PA token to the beneficiary application to allow the beneficiary application to retrieve the access token when the user is logged in to the beneficiary application.

9. The system of claim 8, wherein the operation further comprises:
receiving the PA token from the beneficiary application in a request for the access token; and
sending the access token to the beneficiary application.

10. The system of claim 8, wherein the operation further comprises:
receiving the PA token from the beneficiary application in a request for the access token;
verifying, via a communication from the agent, that the user is logged in to the beneficiary application;
determining the access token has expired;
sending the refresh token to the authorization server to request an updated access token;
receiving the updated access token and an updated refresh token from the authorization server; and
sending the access token to the beneficiary application.

11. The system of claim 8, wherein verifying that the valid session exists between the beneficiary application and the agent comprises:
generating a request token and a state identifier based on the initiation message;
sending, to the beneficiary application in a verification-request message via the network, the request token and the state identifier;
receiving, from the agent via the network, a verification-confirmation message, wherein the verification-confirmation message includes a first copy of the request token and a first copy of the state identifier;
verifying the first copy of the state identifier received in the verification-confirmation message matches the state identifier sent in the verification-request message; and
verifying the first copy of the request token received in the verification-confirmation message matches the request token sent in the verification-request message to confirm the agent is in communication with the beneficiary application.

12. The system of claim 11, wherein instructing the agent to obtain the authorization code comprises:
sending, to the agent via the network in response to the verification-confirmation message, a redirect-to-issuer message, wherein the redirect-to-issuer message includes the state identifier and specifies a uniform resource identifier (URI) of an authorization server associated with the resource server;
receiving, from the agent at a client device via the network, a code-transferal message that includes a second copy of the state identifier and an authorization code associated with the resource server; and
verifying the second copy of the state identifier received in the code-transferal message matches the state identifier sent in the verification-request message.

13. The system of claim 12, wherein obtaining an access token from the authorization server based on the authorization code comprises:
sending, to the authorization server via the network, a token-request message requesting an access token and a refresh token, wherein the token-request message includes the authorization code and the state identifier;

receiving, from the authorization server via the network, a token-grant message that includes the access token and the refresh token; and verifying a third copy of the state identifier received in the token-grant message matches the state identifier sent in the verification-request message.

14. The system of claim 13, wherein the operation further comprises:

generating a response token for the agent based on the token-grant message sending, to the agent via the network, an redirect-to-beneficiary message, wherein the redirect-to-beneficiary message specifies a uniform resource identifier (URI) of a beneficiary server on which the beneficiary application executes and includes the response token;

receiving, via the network from the beneficiary application at the beneficiary server, a response-confirmation message, wherein the response-confirmation message includes a first copy of the response token;

verifying the first copy of the response token received in the response-confirmation message matches the response token sent in the redirect-to-beneficiary message to confirm the beneficiary application is in communication with the agent; and sending, via the network to the beneficiary application in response to the response-confirmation message, a PA-grant message, wherein the PA-grant message includes the PA token.

15. A non-transitory computer-readable storage medium containing instructions that, when executed by one or more processors, perform an operation comprising:

receiving, at a partner authorization (PA) system from an application hosted at a beneficiary server via a network, a first message indicating a user wants to authorize the application to access data hosted at a resource server;

generating a request token and a state identifier based on the first message;

sending, to the application in a second message via the network, the request token and the state identifier;

receiving, at the PA system from an agent executing at a client device via the network, a third message, wherein the third message includes a first copy of the request token and a first copy of the state identifier;

verifying the first copy of the state identifier received in the third message matches the state identifier sent in the second message;

verifying the first copy of the request token received in the third message matches the request token sent in the second message to confirm the agent is in communication with the application;

sending, to the agent via the network in response to the third message, a fourth message, wherein the fourth message includes the state identifier and specifies a uniform resource identifier (URI) of an authorization server associated with the resource server;

receiving, from the agent at the client device via the network, a fifth message that includes a second copy of the state identifier and an authorization code associated with the resource server; and verifying the second copy of the state identifier received in the fifth message matches the state identifier sent in the second message.

16. The non-transitory computer-readable storage medium of claim 15, wherein the operation further comprises:

sending, to the authorization server via the network, a sixth message requesting an access token and a refresh token, wherein the sixth message includes the authorization code and the state identifier.

17. The non-transitory computer-readable storage medium of claim 16, wherein the operation further comprises:

receiving, from the authorization server via the network, a seventh message that includes the access token and the refresh token; and verifying a third copy of the state identifier received in the seventh message matches the state identifier sent in the second message.

18. The non-transitory computer-readable storage medium of claim 17, wherein the operation further comprises:

generating a partner authorization (PA) token for the application and a response token for the agent based on the seventh message;

sending, to the agent via the network, an eighth message, wherein the eighth message specifies a uniform resource identifier (URI) of the beneficiary server and includes the response token;

receiving, via the network from the application at the beneficiary server, a ninth message, wherein the ninth message includes a first copy of the response token;

verifying the first copy of the response token received in the ninth message matches the response token sent in the eighth message to confirm the application is in communication with the agent; and sending, via the network to the application in response to the ninth message, a tenth message, wherein the tenth message includes the PA token.

19. The non-transitory computer-readable storage medium of claim 17, further comprising:

determining that the access token has expired;

sending the refresh token to the authorization server to request an updated access token;

receiving the updated access token and an updated refresh token from the authorization server; and sending the access token to the application.

20. The non-transitory computer-readable storage medium of claim 15, wherein the fourth message comprises a redirect-to-issuer message.

* * * * *